United States Patent
Evans et al.

(10) Patent No.: US 9,170,438 B2
(45) Date of Patent: Oct. 27, 2015

(54) SUPPRESSION OF RESONANT POLARIZATION CONVERSION IN PHOTONIC INTEGRATED CIRCUITS

(75) Inventors: Peter W. Evans, Mountain House, CA (US); Scott Corzine, Sunnyvale, CA (US); Pavel V. Studenkov, Cupertino, CA (US); Mehrdad Ziari, Pleasanton, CA (US); Fred A. Kish, Jr., Palo Alto, CA (US)

(73) Assignee: Infinera Corporation, Sunnyvale, CA (US)

(*) Notice: Subject to any disclaimer, the term of this patent is extended or adjusted under 35 U.S.C. 154(b) by 525 days.

(21) Appl. No.: 13/545,964

(22) Filed: Jul. 10, 2012

(65) Prior Publication Data

US 2014/0016894 A1 Jan. 16, 2014

(51) Int. Cl.
- G02B 6/34 (2006.01)
- G02F 1/025 (2006.01)
- G02B 6/00 (2006.01)
- G02B 6/126 (2006.01)

(52) U.S. Cl.
CPC ........ G02F 1/025 (2013.01); G02B 6/00 (2013.01); G02B 6/126 (2013.01)

(58) Field of Classification Search
None
See application file for complete search history.

(56) References Cited

U.S. PATENT DOCUMENTS

| | | | | |
|---|---|---|---|---|
| 6,757,454 B2* | 6/2004 | Inoue et al. | | 385/15 |
| 2002/0181868 A1* | 12/2002 | McGreer | | 385/37 |
| 2004/0151423 A1* | 8/2004 | Izhaky et al. | | 385/21 |
| 2006/0215957 A1* | 9/2006 | Doerr | | 385/31 |
| 2009/0202247 A1* | 8/2009 | Okayama | | 398/79 |

* cited by examiner

Primary Examiner — Hemang Sanghavi
(74) Attorney, Agent, or Firm — David L. Soltz

(57) ABSTRACT

A device may include a number of optical waveguides, each of which being spaced from one another. The optical waveguides may each include at least one curved section and widths of the curved sections of the optical waveguides may be selected to reduce polarization conversion of light traversing the birefringent optical waveguides.

18 Claims, 8 Drawing Sheets

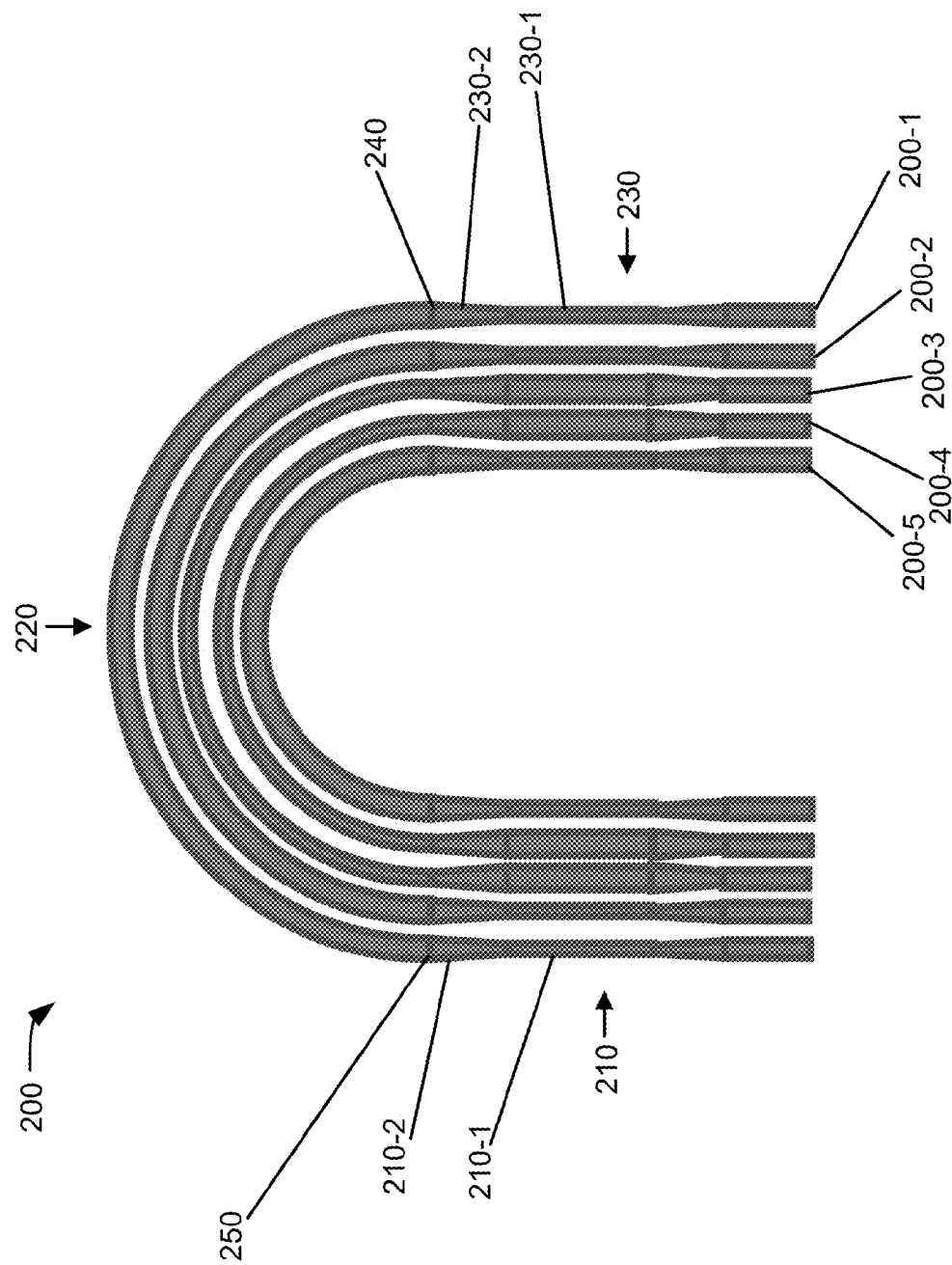

SUPPRESSION OF RESONANT POLARIZATION CONVERSION IN PHOTONIC INTEGRATED CIRCUITS

BACKGROUND

Conventional optical communication systems are known in which light having a single wavelength is modulated in accordance with an information stream and transmitted along an optical communication path, such as an optical fiber. In order to increase the information carrying capacity of such systems, so-called wavelength division multiplexed (WDM) optical communication systems have been developed. In a WDM optical communication system, multiple modulated optical signals, each having a different wavelength, are transmitted on the optical communication path. WDM optical communication systems often include optical transmitters, which output the optical signals, and an optical combiner, which combines the optical signals into a WDM optical signal that is supplied to one end of an optical communication path. At the receive end of the optical communication path, the optical signals may be de-multiplexed and supplied to corresponding optical receivers.

In order to further increase the capacity of WDM optical communications systems, optical signals having different polarizations, but the same wavelength, are modulated independently of each other and combined or polarization multiplexed onto the optical communication path. Thus, optical signals, at each wavelength, can have first light with a first polarization and second light with a second polarization, and the first and second light may be modulated to carry separate information streams. As generally understood, the first polarization component may have a transverse electrical (TE) polarization and the second polarization component may have a transverse magnetic (TM) polarization, such that the TE polarization is oriented in an orthogonal direction relative to the TM polarization.

WDM optical communication systems may be assembled from discrete components, wherein, for example, the transmitters and combiners are housed separately from one another or provided or mounted on a board or card. Alternatively, photonic integrated circuits (PICs) have been developed in which these components, as well as others, are integrated on a common semiconductor substrate. In order to realize further capacity increases, modulated optical signals generated by a PIC may be polarization multiplexed, as noted above.

In particular, each of the optical transmitters on the PIC may include a laser, and portions of the light output from the laser may be separately modulated to provide first and second modulated optical signals having the same wavelength. Since, as generally understood, the laser typically outputs light having a TE polarization, the polarization of one of the first and second modulated optical signals may be rotated by a polarization rotator to have TM polarization while the other modulated optical signal is not rotated and remains at a TE polarization. The first and second modulated optical signals (also referred to herein as TE and TM modulated optical signals, respectively) may then be combined in a polarization beam combiner provided either on the PIC or off the PIC.

In one example, the PIC includes one or more waveguides which direct the TE polarized light portions supplied by the laser from one component on the PIC to another prior to rotation and polarization multiplexing. For example, a waveguide may be provided that routes or directs lght from the laser to the combiner. A modulator may be provided between the laser and combiner, which may also include waveguides. In addition, known combiners, such as arrayed waveguide gratings may further include waveguides.

The waveguides on a PIC may include both straight and bent or curved portions in order to conform to a device layout, for example. The straight and curved portions of the waveguide have different radii of curvature ("ROC"), such that there is an abrupt change in the ROC (i.e., a discontinuity) where a straight section joins a curved section, for example. Many such ROC discontinuities may occur over the length of a waveguide. If this "ROC profile" contains large enough abrupt changes or discontinuities in ROC, it can induce polarization scattering from the desired TE light to undesirable TM light. The scattered light from the multiple scattering events can add up as light propagates down the length of the waveguide. Because the scattered light remains coherent (trapped in the TM mode of the waveguide), how the various components add up will depend on their phase relationships.

U.S. Patent Application Publication 2012/0002920, the contents of which are incorporated herein by reference, describes adjusting the phase relationships of the various scattered TM light components to destructively interfere with each other, thereby minimizing the combined scattering to TM light. In short, the previously described method involves adjusting the physical lengths of the various arcs in the waveguide to be an integer multiple of the so-called "TE-TM beat length" of the waveguide.

The TE-TM beat length of the waveguide is simply $\lambda/\Delta N$, where $\lambda$ is the free-space wavelength of light propagating in the waveguide, and $\Delta N$ is the difference between the effective refractive index (neff) of the fundamental TE and TM modes of the waveguide (i.e. $\Delta N = neffTE - neffTM$). $\Delta N$ is known in the art as the "birefringence" of the waveguide. High birefringence means the TE and TM fundamental modes travel at very different speeds. Low birefringence means the TE and TM modes travel at very similar speeds. The beat length physically represents the length of waveguide required to reproduce the phase relationship between TE and TM light. In other words, if TE and TM light in the fundamental modes of the guide have a given phase relationship at one location, as they propagate down the waveguide, the phase relationship will drift due to the light propagating at different speeds in the guide. At one beat length down the guide, the phase drift will equal $2\pi$ radians, and hence, the phase relationship will be the same as it was one beat length earlier.

A curved section that is an integer multiple of beat lengths is like having no curved section at all, thereby eliminating scattering to TM light. Physically, if the curved section arc length is an integer multiple of beat lengths, the TM light scattering at the entrance and exit of the curved section will add destructively, cancelling out or minimizing the combined TM light scattering. Likewise, if the curved section is an odd integer multiple of half a beat length, the entrance and exit scattered TM light components will add constructively leading to "resonant TM polarization scattering."

In the US Patent Application Publication noted above, arc lengths are set to integer multiples of the beat length to minimize TM light scattering, and avoid the undesirable resonant TM polarization scattering condition. However, it is often the case that the geometry of the waveguide circuit is constrained to specific dimensions. In such cases, the arc may not be set to the desired length. One example of such a constrained arc length scenario is multiple parallel waveguides that bend together, where the inner and outer arc lengths are necessarily different from each other. In this case, it is not possible to individually optimize the arc length of each waveguide.

Therefore, there is a need to optimize curved sections to avoid the resonant TM polarization scattering condition without adjusting the arc lengths.

SUMMARY

According to one or more possible implementations, a device may include a first waveguide, including a curved section having a first width, the first width being selected to provide a birefringence that avoids resonant polarization conversion between the entrance and exit ROC discontinuities of the curved section in the first waveguide. The device may further include a second waveguide, including a curved section having a second width, the second width being different than the first width and the second waveguide being spaced from the first waveguide. Likewise, the second width may be selected to avoid resonant polarization conversion between the entrance and exit ROC discontinuities of the curved section in the second waveguide. The polarization conversion in the first and second waveguides may be reduced relative to resonant polarization conversion that could otherwise occur if the first and second waveguides were of equal width.

According to other possible implementations, an optical bus may include optical waveguides which are spaced from one another. The optical waveguides may include at least one curved section, and widths of the curved sections of the optical waveguides may be selected to not be equal to one another and selected to reduce polarization conversion relative to the resonant polarization conversion condition.

According to yet another aspect, a photonic integrated circuit may include a substrate; optical sources formed on the substrate; and optical modulators, formed on the substrate, to receive light from the optical sources and to modulate the light. The photonic integrated circuit may also include optical waveguides, formed on the substrate and arranged in parallel to one another, the optical waveguides transmitting light output from the optical sources or the optical modulators and the optical waveguides each including at least one curved section. The widths of the curved sections of the optical waveguides being selected to reduce polarization conversion of light traversing the optical waveguides relative to the resonant polarization conversion condition.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram conceptually illustrating a bus of waveguides;

DETAILED DESCRIPTION

The following detailed description refers to the accompanying drawings. The same reference numbers in different drawings may identify the same or similar elements.

A device and method are disclosed that avoid the resonant TM polarization scattering condition in multiple parallel bends (or in waveguides that are spaced from one another) without having to change the arc lengths. In one implementation, the beat length is adjusted by changing the birefringence of the waveguide. For example, the birefringence of the waveguide may be adjusted by changing the waveguide width. In the case of multiple parallel bends, the beat length of each arc can be finely tuned or adjusted by changing the waveguide width, such that an integer multiple of the beat length becomes nominally aligned with the physical arc length of each of the curved sections of each of the parallel waveguides. The beat length can be adjusted to, at a minimum, avoid the undesirable resonant TM polarization scattering condition by being as far away as possible from an odd integer multiple of half beat lengths. Accordingly, waveguide curves or arcs on a PIC are not restricted to a particular length, but may have any desired length to conform to a given device layout, and design of the PIC may be made more flexible.

The techniques described herein may be used in a number of possible applications in a PIC, such as with waveguides used to generally route light between optical components, after optical sources, before and after optical filters, and/or as part of the implementation of modulators, such as Mach-Zehnder interferometers.

Figure 1A:
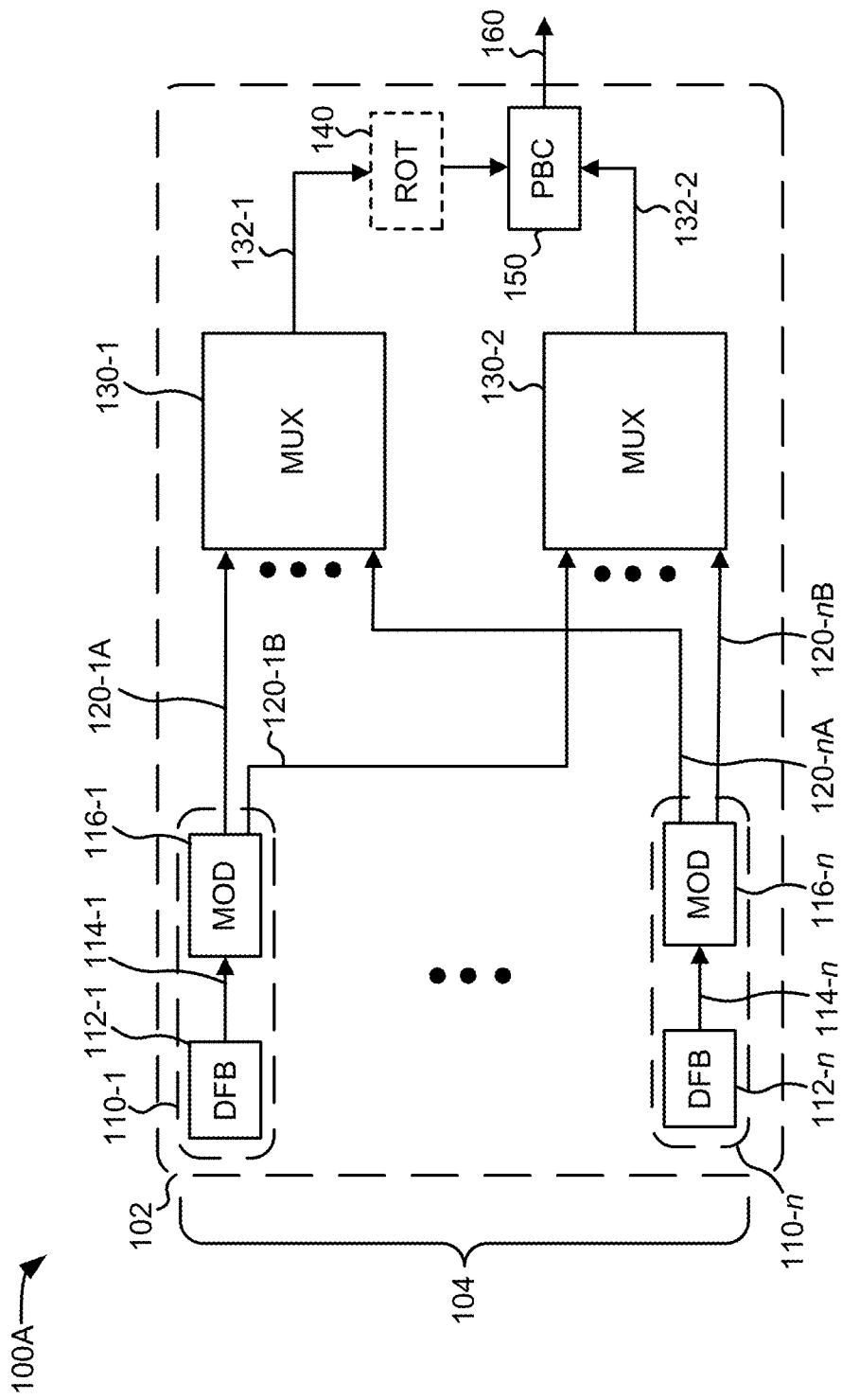
FIGS. 1A, 1B, and 1C are diagrams that illustrates examples of optical circuits in which the techniques described herein may be used.

FIG. 1A is a diagram that illustrates an example of an optical system 100A in which the techniques described herein may be used. Optical system 100A may be formed on a substrate of a PIC. Substrate 102 may include indium phosphide (InP) or another semiconductor material. A number of optical components 104 may be placed on substrate 102.

Optical system 100A may include an optical transmission system. Optical components 104 may include a number n of signal paths 110, first and second multiplexers 130, an optional polarization rotator 140 (in dashed line) and a polarization beam combiner (PBC) or multiplexer 150, provided on substrate 102. With specific reference to signal path 1, e.g. 110-1, each of the signal paths 110-1 through 110-n, collectively referred to herein as signal paths 110, may include a light source 112-1, a power splitter 114-1, and a pair of modulators 116-1. The light source 112-1 may be any suitable light source, for example a distributed feedback (DFB) laser or a distributed Bragg reflector (DBR) laser. Power splitter 114-1 may include, for example, a 3 dB optical coupler. The light source 112-1 may be fabricated with an active region including strained layers providing preferentially high gain to a polarization state, for example a TE polarization state. For example, for a light source fabricated in an InP material system, compressively-strained quantum wells or active regions may produce TE-polarized light.

Light from the light source 112-1 may be split by power splitter 114-1 and provided to modulators 116-1. Modulators 116-1 may be configured to each accept and provide a modulated output light signal, each output having a polarization state. The polarization state may be the same for each of the first and second modulated outputs or may be different, as discussed below. The first modulated output of the modulator 116-1 may be provided to an input of a first multiplexer 130-1 and the second modulated output of the modulator 116-1 may be provided to an input of a second multiplexer 130-2. Each of the first and second multiplexers 130 may be wavelength multiplexers.

The first multiplexer 130-1 (which may include an arrayed waveguide grating (AWG), for example) may combine the received modulated output signals 120-nA from each of the modulators 116 of each signal path 110, and combines the signals 120-nA into a multiplexed signal, for example a WDM signal. Similarly, the second multiplexer 130-2 may receive each of the modulated outputs 120-nB from each of the modulators 116 of each signal path 110, and may combine the signals 120-nB into a multiplexed signal, for example a WDM signal. The multiplexed output of the first multiplexer 130-1 may be provided to a first input of polarization beam combiner 150 and the multiplexed output of the second multiplexer 130-2 may be provided to a second input of the polarization beam combiner 150. The polarization beam combiner 150 may then combine the first and second multiplexed outputs from the first and second multiplexer 130, respectively, into a polarization multiplexed output signal 160. If each of the modulated outputs 120-nA, 120-nB are of the same polarization state, e.g. a TE polarization state, then the multiplexed signal from one of the multiplexers 130, for example the first multiplexer 130-1 as depicted, may be rotated in the optional polarization rotator 140.

As shown with respect to optical system 100A, each signal path 110 provides for two modulated outputs, for example first modulated outputs 120-nA and second modulated outputs 120-nB. While shown as being provided on the substrate 102, the signal paths 110, or the various elements of the signal paths 110, may be provided on one or more additional substrates (not shown). Each of the light sources 112 may provide light of the same polarization state. Alternatively, a first group of light sources 112 may provide light of a first polarization state, while a second group of light sources 112 may provide light of a second polarization state. In any case, the modulated outputs provided to the first multiplexer 130-1 on corresponding waveguides 120-nA may be the same polarization, and the modulated outputs provided to the second multiplexer 130-2 on corresponding waveguides 120-nB may be of the same polarization.

It should be noted that the optional rotator 140 would not be needed if one of the two modulated outputs of each signal path 110 was polarization rotated via a corresponding polarization rotator (not shown) prior to being provided to a multiplexer 130. For example, given that each of the light sources 112-1 provides light having a TE polarization state, each of the modulated outputs provided on waveguides 120-nB may be rotated to have a TM polarization state prior to being provided to multiplexer 130-2. Thus, each modulated output signal as part of the multiplexed output signal of multiplexer 130-1 would have a TE polarization state, and each modulated output signal as part of the multiplexed output signal of multiplexer 130-2 would have a TM polarization state. The polarization beam combiner 150 would then combine the first and second multiplexed outputs received via waveguide 132-1 and waveguide 132-2, respectively, to provide the polarization multiplexed output signal 160. It is also understood that the TE polarization state or mode and TM polarization state are used in an exemplary fashion. Other polarization states, therefore, may be utilized, such polarization states being maintained consistent with the present disclosure.

A first output of each WDM multiplexer may pass through other optical elements and will finally connect to polarization beam combiner 150. Polarization beam combiner 150 may be part of substrate 102, or might be off-chip or on another substrate. In either case, polarization states may need to be maintained up to the input of polarization beam combiner 150. If the polarizations are not maintained, the different inputs to polarization beam combiner 150 may interfere with one another, which may introduce noise to the modulated signals, thus reducing the SNR of the signals, as noted above. A lower SNR may make recovery of the signals (at a receiver) more difficult or impossible.

Figure 1B:
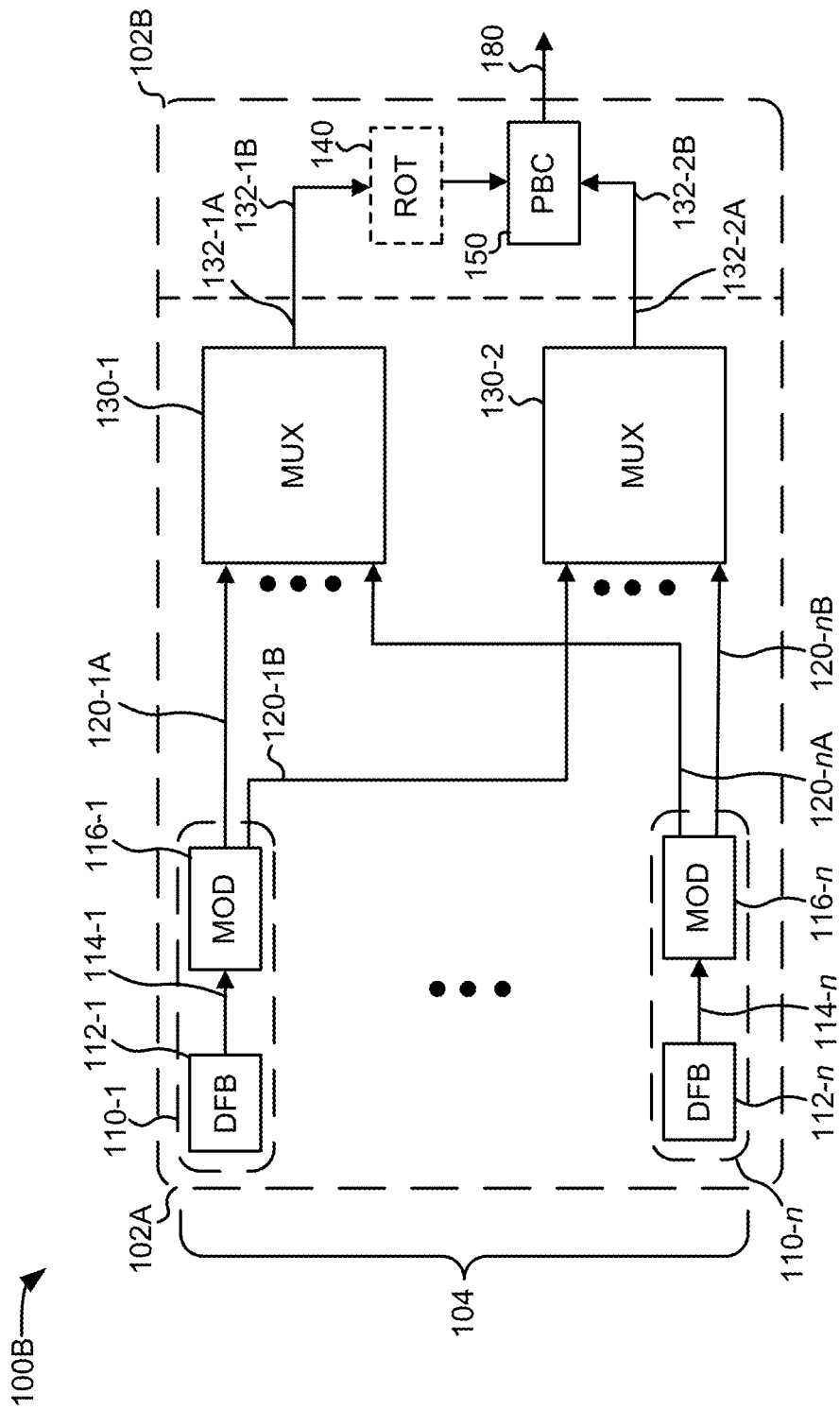

A second example of an optical system, similar to that shown in FIG. 1A, is shown in FIG. 1B. Optical system 100B may include the n signal paths and first and second multiplexers 130 provided on a first substrate 102A, while the optical rotator 140 and the polarization beam combiner 150 are provided on a second substrate 102B. The multiplexed output signals from the multiplexers 130 are provided on a first waveguides 132-1A, 132-2A along the first substrate 102A, and second waveguides 132-1B, 132-2B, respectively, along the second substrate 102B. The two substrates 102A, 102B may be connected as shown, and may be monolithically integrated or may constitute a hybrid assembly. Alternatively, substrates 102A and 102B may be provided as discrete components and may be spaced from each other. In the case where the substrates 102A, 102B are spaced from each other, the multiplexed output signals propagating on waveguides 132-1A, 132-2A would be interfaced or coupled to corresponding waveguides 132-1B, 132-2B via a pair of fiber optical cables, preferably polarization maintaining fiber optical cables as are known in the art. Waveguides 132-1A, 132-2A may be short in length and provide little to no bends prior to reaching an edge of the substrate 102A. While depicted to reach the edge of the substrate 102A generally perpendicular to the edge, the waveguides 132-1A, 132-2A may interface with the edge of the substrate 102A at an angle to mitigate reflections. The output of the multiplexers 130, for example, may be close to and oriented toward the edge of the substrate 102A. Moreover, the orientation of the multiplexers 130 may be configured in such a way as to minimize propagation distance and a number of bends from the output of each of the multiplexer 130 to the input of the polarization beam combiner or multiplexer 150. Therefore, changes to the polarization state of the modulated output signals of the multiplexers 130 may be mitigated, and the polarization state of the modulated output signals being preserved.

In FIGS. 1A and 1B, polarization states may need to be maintained up to the input of polarization beam combiner 150. If the polarizations are not maintained, the different inputs to polarization beam combiner 150 may interfere with one another, which may introduce noise to the modulated signals, thus reducing the SNR of the signals. In addition, undesired TM light associated with polarization conversion may also reduce SNR of the signals, as noted above.

Figure 1C:
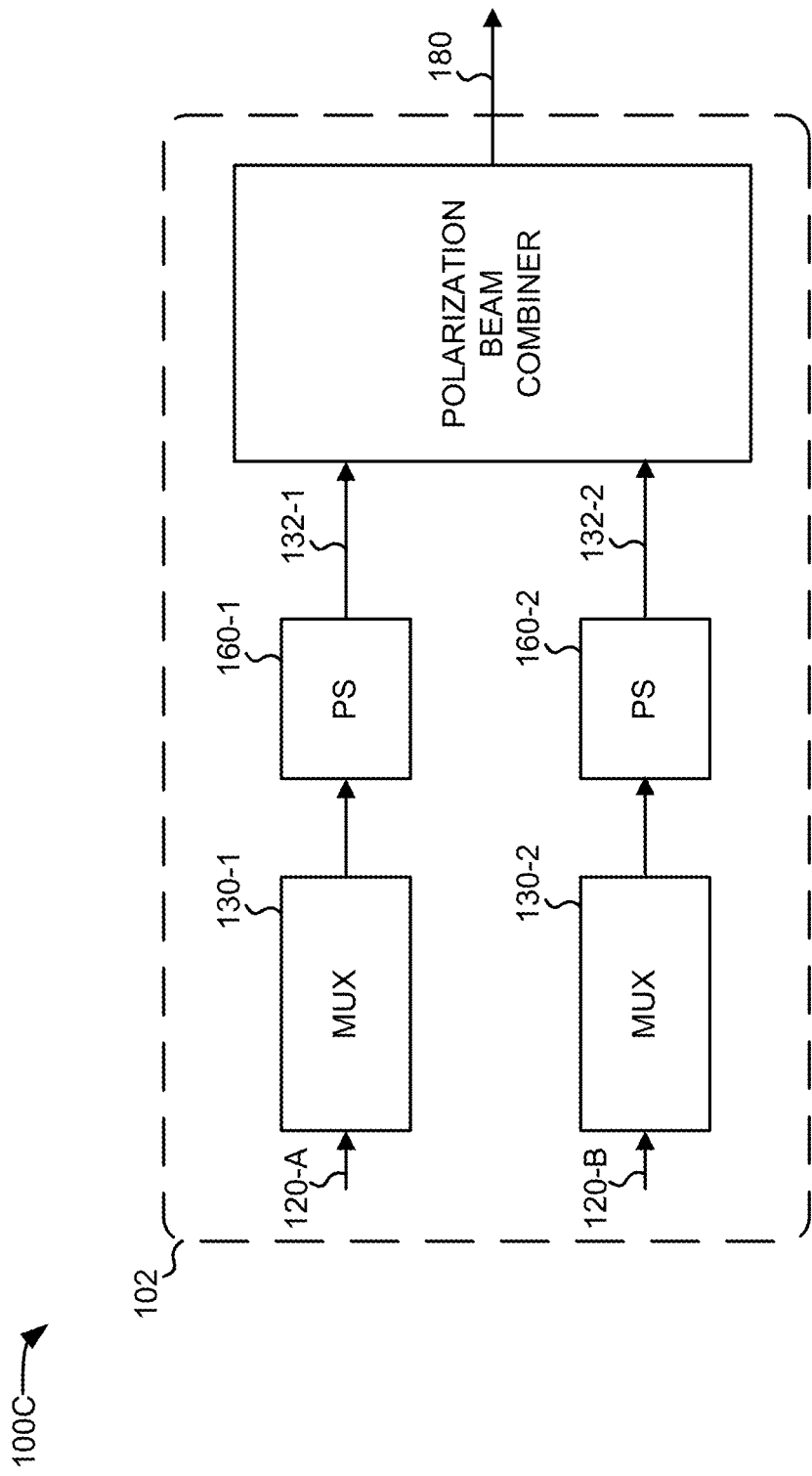

FIG. 1C is a diagram illustrating another example of an optical system circuit 100C in which the techniques described herein may be used. Optical system 100C may be similar to the optical system 100A of FIG. 1A but may include a pair of polarization strippers 160. A first polarization stripper 160-1 may accept the multiplexed output signal from the first multiplexer 130-1 and a second polarization stripper 160-2 may accept the multiplexed output signal from the second multiplexer 130-2. Each of the first and second polarization strippers 160 may be configured to remove unwanted polarization states in the corresponding multiplexed output signals propagating through the strippers 160. In addition to augmenting the ability of the multiplexer to remove unwanted polarization states from the multiplexed output signals, the polarization strippers 160 may also remove unwanted polarization states that may be generated as the signal propagates from the outputs of the multiplexers 130 to the polarization beam combiner 150 or unwanted polarization states introduced elsewhere in the optical system. The polarization strippers 160 may take the form of a birefringent Mach-Zehnder beam splitter, providing an output signal corresponding to a single output of the splitter, the output signal having the desired polarization state.

It may be important for the light input to polarization strippers 160 to be at the correct polarization. For example, assume that the optical path, in optical system 100C, including polarization stripper 160-1, is designed to operate with TE mode light and polarization stripper 160-1 is designed to remove TM mode light from the optical path. Unwanted TM mode light may be unintentionally introduced into the optical path by, for example, polarization rotation stemming from ROC discontinuities where, for example, a straight portion of the waveguide joins a curved portion, as discussed above. Alternatively, other ROC discontinuities may occur where a first curved portion having an associated first ROC joins a second curved portion having an associated second ROC, as in an S-shaped curve, for example.

Although polarization stripper 160-1 may remove the unwanted TM mode light, the unintentional conversion of the TE mode light to TM mode light may result in lost signal strength of the TE mode light, which may be referred to as conversion losses, as noted above. Conversion losses may be undesirable.

The optical components illustrated in FIGS. 1A-1C may be connected by and/or may include waveguides. The waveguides may, at certain portions of the waveguide, include a bus (where a bus may be defined as two or more waveguides) of closely-spaced waveguides, which may include bends or curves.

Although FIGS. 1A-1C show example components of optical systems, in other implementations, the optical systems may contain fewer components, different components, differently arranged components, and/or additional components than those depicted in FIG. 1. Alternatively, or additionally, one or more components of the optical system may perform one or more other tasks described as being performed by one or more components. In general, concepts described herein may be applied to any set of optical components that includes waveguides that include one or more curves or bends.

FIG. 2 is a diagram conceptually illustrating a bus 200 of waveguides, where a bus may refer to multiple waveguides. Bus 200, as shown, includes five waveguides (200-1, 200-2, 200-3, 200-4, and 200-5) that are spaced from one another. In one example, each of these waveguides is parallel to one another. Each of the five waveguides includes a first straight section, such as section 210 of waveguide 200-1; a curved section, such as curved section 220 of waveguide 200-1; and a second straight section, such as straight section 230 of the waveguide 200-1. At location 240 where straight section 230 joins curved section 220, a first ROC discontinuity may exist because straight section 230 has an ROC (which is infinite) that is different than that of curved section 220. A second ROC discontinuity exists at location 250 where curved waveguide section 220 joins straight waveguide section 210. TE light propagating in waveguide 200-1 from straight section 230 to straight section 210 via curved section 220 may experience polarization conversion at the first and second ROC discontinuities (locations 240 and 250) whereby a portion of the TE light is converted to first TM light at location 240 and a second portion of the TE light is converted to second TM light at location 250. Preferably, the length and/or width of the curved waveguide section 220 is selected so as to not be an odd integer multiple of half beat lengths to avoid or substantially reduce the undesired resonant TM polarization scattering relative to resonant polarization conversion that could otherwise occur if the waveguide sections were of equal width and having the same birefringence. By providing such length and/or width, however, the optical path length of waveguide 200-1 may not be at a desired value due to the refractive index change created by changing the width of waveguide 200-1 in curved section 220. Moreover, the optical path length of waveguide 200-1 may be made different than that of remaining waveguides 200-2 to 200-5, even though waveguides of equal optical path length may be desired. Accordingly, consistent with the present disclosure, the widths of the straight sections, (e.g., 210 and 230) may be varied to compensate for such optical path length differences so that the total optical path length of waveguide 200-1 (including both curved and straight sections) is at a desired value.

The dimensions of waveguide 220 are preferably selected so that waveguide 220 has a birefringence that results in a beat length that is equal to or substantially equal to the length of curved portion 220. The reason for this is as follows. The first TM light generated by conversion of the TE light at the first ROC discontinuity will have some phase, $\theta_{TM-TE}$, with respect to the TE light at location 240. The second TM light at the second discontinuity, however, where the bend turns back in the opposite direction, will have a phase with respect to the second TE light at 250 equal to $\theta_{TM-TE}+\pi$ (the extra $\pi$ radians because the bend is in the opposite direction). If the length of the curved portion 220, i.e., the distance between the first and second ROC discontinuities, is a beat length, then the first TM portion will arrive at location 250 (the second discontinuity) with its original phase $\theta_{TM-TE}$ relative to TE light at 250. Since the TM portion generated at location 250 (the second discontinuity) has phase $\theta_{TM-TE}+\pi$, the first and second TM portions will destructively interfere with one another at location 250. Accordingly, an anti-resonant condition occurs at location 250 and polarization conversion is either substantially reduced or eliminated relative to the resonant polarization conversion condition so that undesired TM light is minimized and does not contribute to noise in output signal 160 (see FIG. 1).

As noted that by varying the width of sections of waveguide 200-1, for example, a suitable birefringence can be obtained, such that curved portion 220 has a length equal to the beat length associated with the TE light and the TM portions (resulting in an anti-resonant condition at the second discontinuity). Put another way, the waveguide widths can be tailored to yield a beat length equal to a particular physical arc length of the waveguide as required by a given PIC layout. Although the arc length of section 220 is described above as being equal to the beat length, the arc length may also be equal to or substantially equal to an integer number of beat lengths.

In FIG. 2, the relative sizes of the waveguides included in bus 200, such as the relative widths of the waveguides, are conceptually illustrated for clarity. In practice, the relative widths of the waveguides may be closer to one another (or farther apart) than illustrated.

Figure 3:
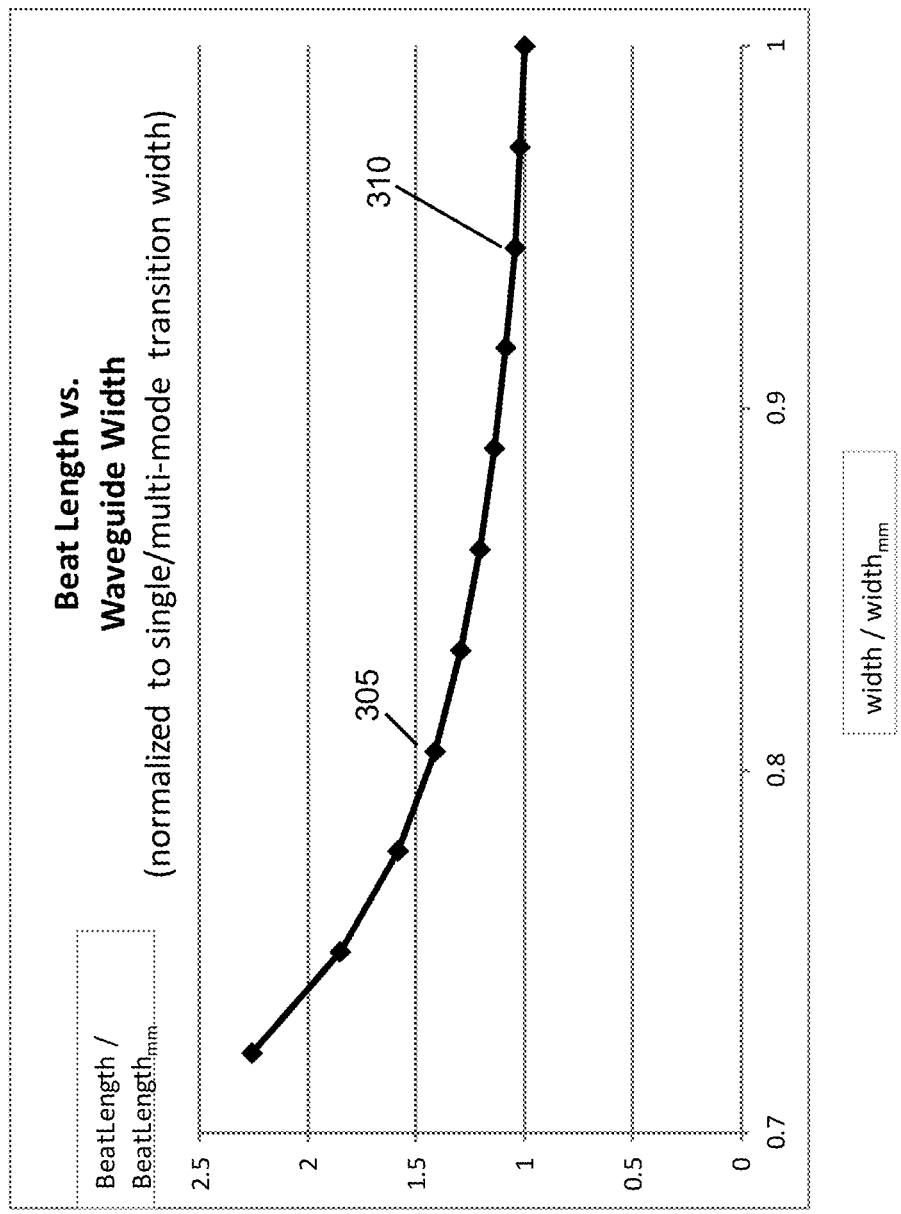
FIG. 3 is a graph plotting an example of polarization beat length versus waveguide width.

FIG. 3 is a graph plotting an example of beat length (vertical axis) versus waveguide width (WVG, horizontal axis). As illustrated, relatively small changes in the width of a waveguide can cause significant changes in birefringence, and, in turn, the beat length. For example, at a normalized waveguide width of 0.8, the corresponding normalized beat length may be approximately 1.5 (point 305). Increasing the normalized waveguide width by 15% to approximately 0.95, the corresponding normalized beat length is reduced by approximately 33% to approximately 1 (point 310).

Figure 4:
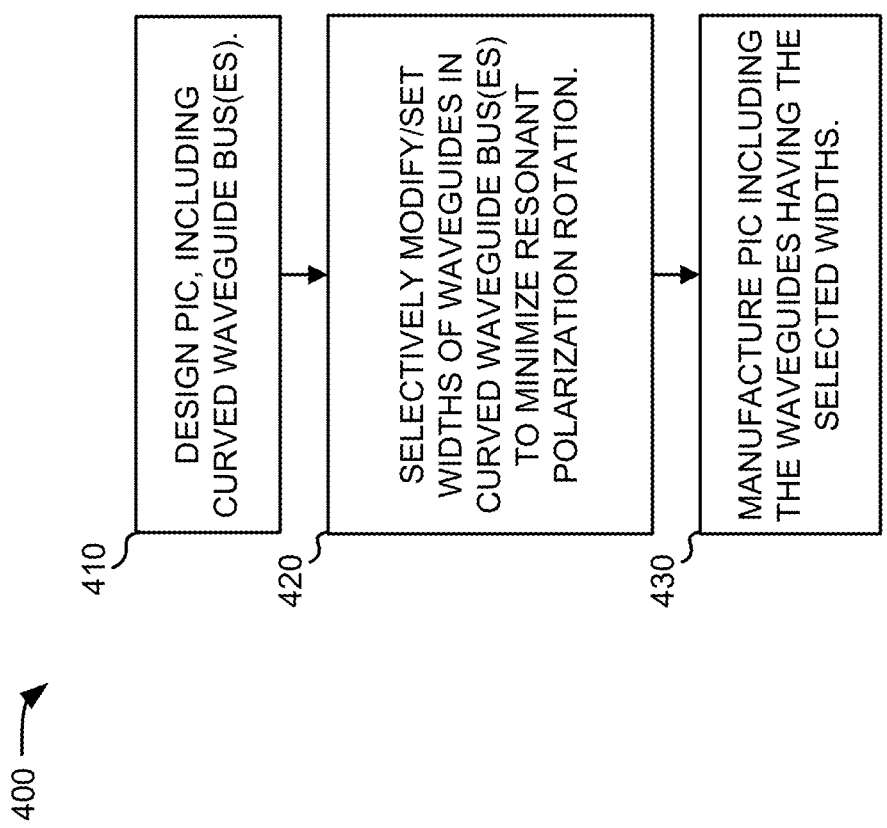
FIG. 4 is a flowchart illustrating an example process for designing a waveguide bus.

FIG. 4 is a flowchart illustrating an example process for designing a waveguide bus, such as bus 200. In designing bus 200, it may be desirable to design the bus to minimize polarization rotation. For example, it may be desirable to minimize the polarization rotation for TE and TM mode signals over the length of curve section 220 of bus 200.

Process 400 may include designing a PIC, such as a PIC used in the optical systems of FIGS. 1A-1C (block 410). The PIC may include a number of optical components, including waveguides (block 410). As previously mentioned, the waveguides may include a waveguide bus that includes bends or curves. The waveguide bus may be implemented as, for example, waveguides after optical sources, before and/or after optical filters, as part of the implementation of modulators, such as Mach-Zehnder interferometers, and/or for general purpose routing of light.

Process 400 may further include selectively adjusting or setting (during the design of the optical system) the widths of the waveguides in the bus to minimize polarization rotation (block 420). As previously discussed, and as illustrated in FIG. 3, changes in the width of a waveguide can cause changes in the beat length of the waveguide. By selectively changing the widths of different waveguides in a waveguide bus, the beat length of each waveguide in the waveguide bus can potentially be adjusted to a value that minimizes polarization conversion. In one implementation, for each waveguide, a width may be chosen such that, over the curved portion of the waveguide, the arc-length of the waveguide is an integer multiple or substantially an integer multiple of the beat length of the waveguide.

In one implementation, the width of each waveguide may be selected as an arbitrary value within a range of widths that are allowable for the technology of the PIC being created. In an alternative possible implementation, the width of each waveguide may be selected from a set of discrete widths. For example, each waveguide may be selected from the set of widths including 1.4 and 1.6 micrometers. Preferably, widths that are so narrow as to cause excessive scattering loss and widths that are so wide as to increase conversion to and guiding of higher order spatial modes should be avoided.

Process 400 may further include manufacturing the PIC to include the waveguides having the widths selected to reduce polarization rotation (block 430).

Figure 5:
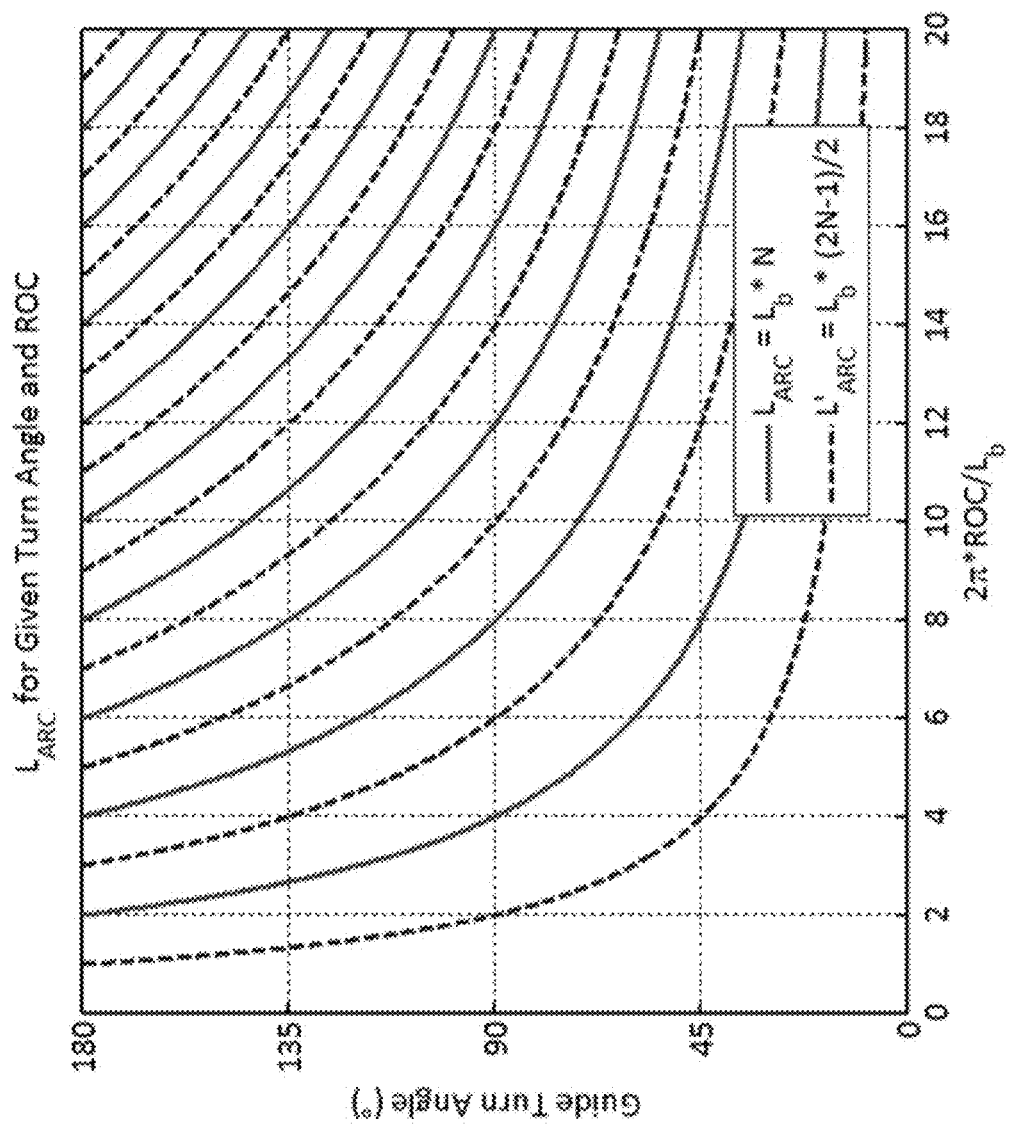
FIG. 5 is a diagram plotting an example of anti-resonant polarization states as a function of arc-length and radius of curvature for a waveguide.

FIG. 5 is shows a series of solid and dashed curves, each of which being a plot of a turn angle of a waveguide versus the $2\pi*ROC/L_b$, where ROC is the radius of curvature of the waveguide about the turn or bend, and $L_b$ is the beat length. For convenience, the parameter $2\pi*ROC/L_b$ will be referred to herein as "X".

The solid lines in FIG. 5 correspond to combinations of turn angle and X in which the resulting arc length of the waveguide ($L_{ARC}$) is an integer number (N) of $L_b$ ($L_{ARC}=N*L_b$). As noted above, the resonant TM polarization scattering condition may be minimized or avoided when $L_{ARC}$ satisfies $N*L_b$. On the other hand, for arc lengths ($L'_{ARC}=((2N-1)/2)*L_b$) equal to an odd integer number of half beat lengths ($L_b$), resonant TM polarization scattering is undesirably increased. The dashed curves in FIG. 5 correspond to combinations of turn angle and X resulting in such increased resonant TM polarization scattering.

As further shown in FIG. 5, for a given ROC/$L_b$ ratio, a waveguide may either support the resonant TM polarization scattering condition or such condition may be suppressed depending on the turn angle of the waveguide. Thus, although waveguide layout constraints may require a particular ROC and turn angle, for example, reduced resonant TM polarization scattering may nevertheless be realized by appropriately selecting the beat length (e.g., by varying the width of the waveguide) to correspond to a point on one of the solid curves, for example, in FIG. 5. Accordingly, waveguides may be flexibly designed to have minimal resonant TM polarization scattering.

For some optical components, such as for Mach-Zehnder interferometers and other optical components, it may be additionally necessary to match optical path lengths in bus 200. Varying the waveguide widths in curved section 220 may result in potential optical path length mismatches. To compensate, waveguide widths in other portions of bus 200 may be modified to compensate for the optical path length mismatches. Compensation for optical path length mismatches are also illustrated in FIG. 2. For example, as shown, in the first straight portion 210 and the second straight portion 230, the waveguides that have smaller widths within curved portion 220 (i.e., the second and third innermost waveguides) have larger widths in straight portions 210 and 230. Similarly, the waveguides that have larger widths within curved portion 220 (i.e., the innermost and two outermost waveguides) have smaller widths in straight portions 210 and 230. The overall optical path lengths for each of the waveguides shown in FIG. 2 may be the same or substantially the same. The physical length of paths may also be adjusted in order to compensate width-induced optical path length differences, but that sort of correction will be susceptible to subtle changes in waveguide pattern definition and etching. Mach-Zehnder Interferometers employed in PIC modulation circuits typically do not have optical path length differences larger than a few tenths of a micron in order to avoid exaggerated phase shifts with small changes in temperature.

Figure 6:
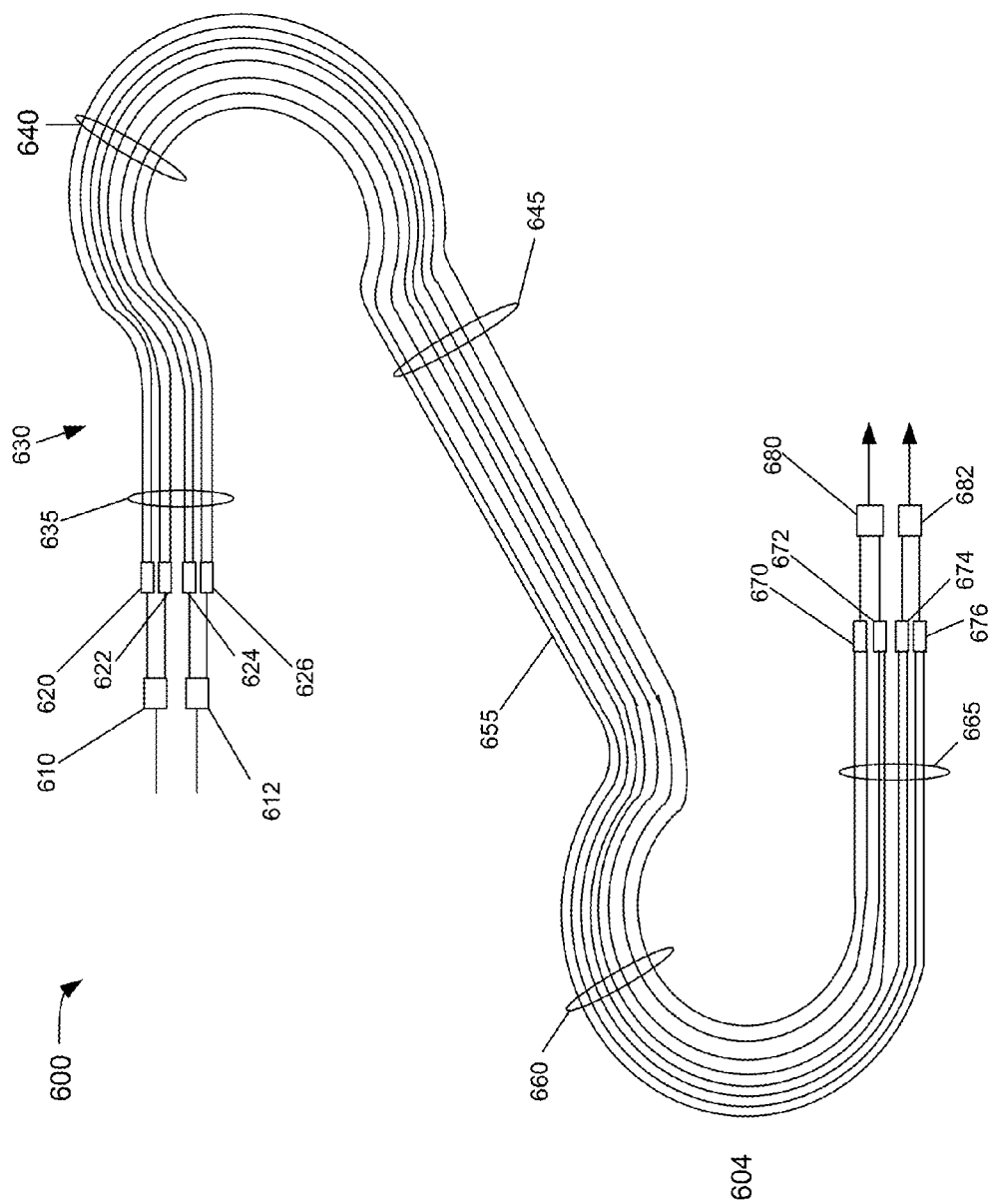
FIG. 6 is a diagram illustrating one example of optical components that may include a waveguide bus having curved portions.

As discussed above, a number of optical components or waveguide configurations may be implemented using the techniques described herein. FIG. 6 is a diagram illustrating one example of optical components 600 that may include waveguide buses having curved portions. The waveguide bus shown in FIG. 6 may be, for example, a waveguide bus that is implemented as part of a Mach-Zehnder (MZ) interferometer. Optical component 600 may include an upper portion 602 and a lower portion 604.

Upper portion 602 may include input optical couplers 610 and 612, optical couplers 620, 622, 624, and 626, and waveguide bus 630. Couplers 610 and 612 may each include a multi-mode interference (MMI) coupler or a Y-coupler and may include an input that receives light from a DFB laser. Coupler 610 may include first and second outputs that supply a first part or portion of the received light to couplers 620 and 622. Coupler 610 may include first and second outputs that supply a first part or portion of the received light to couplers 624 and 626. Each of couplers 620, 622, 624, and 626 may similarly include an MMI coupler or a Y-coupler. Each of couplers 620, 622, 624, and 626 may have first and second outputs that supply light to waveguide bus 630.

Waveguide bus 630 may include a straight portion 635, followed by a curved portion 640, and followed by a straight portion 645. Each waveguide in curved portion 640 may be associated with a ROC and an arc-length.

It may be desirable to minimize polarization rotation in curved portion 640. As described above, the widths of the waveguides in curved portion 640 may be varied to minimize polarization rotation. In this manner, the relative polarization of light traversing curved portion 640 of waveguide bus 630 may be maintained so that light reaching straight portion 645 is associated with minimum polarization conversion.

Lower portion 604 may be implemented similarly to upper portion 602 and may include waveguide bus 650, couplers 670, 672, 674, and 676, and output couplers 680 and 682. Waveguide bus 650 may include a straight portion 655, followed by a curved portion 660, and followed by a straight portion 665. Each waveguide in curved portion 640 may be associated with a ROC and an arc-length.

Couplers 670, 672, 674, and 676 may include MMI couplers or Y-couplers that receive light from waveguide bus 650 and include first and second outputs that supply light to output couplers 680 and 682.

It may also be desirable to minimize polarization rotation in curved portion 660 of waveguide bus 650. As described above, the widths of the waveguides in curved portion 660 may be varied to minimize polarization rotation. In this manner, the relative polarization of light traversing curved portion 660 of waveguide bus 650 may be maintained so that light reaching straight portion 665 is associated with minimum polarization conversion.

As described herein, a waveguide bus may include a quantity of waveguides in which the bus includes one or more curved portions. The width of the waveguides may be varied to minimize polarization rotation conversion over the extent of the curved portion of the bus. In one implementation, the width of each waveguide may be chosen, so that over the curved portion of the waveguide, the arc-length of the waveguide is an integer multiple or substantially an integer multiple of the beat length.

In the above examples, polarization rotation conversion is minimized in waveguides provided in an optical transmitter. It is understood, however, that similar reduction in polarization rotation conversion may be realized in waveguides provided in an optical receiver. In one example, in which the optical receiver is a coherent receiver including a local oscillator, reduced polarization rotation conversion may be advantageous in order to more closely match the polarization of light output from the local oscillator to maximize the extinction ratio and received power. Also, if a semiconductor optical amplifier (SOA) is provided that is configured to provide gain to optical signals having a desired polarization, reducing polarization rotation conversion may be beneficial in matching the polarization of an incoming signal to the desired polarization of the SOA.

In addition, in the above examples, variations in width result in changes in birefringence that, in turn, results in reduced polarization rotation conversion. It is understood, however, that other parameters may be varied to provide similar changes in birefringence that may also result in reduced polarization rotation conversion. For example, the waveguide may be subjected to stress, the core or active region may be selectively disordered or may have different thicknesses, the index of the core and/or cladding may also be varied, and a selective area growth structure may be provided in order to selectively change the birefringence of one waveguide with respect to another.

The foregoing description provides illustration and description, but is not intended to be exhaustive or to limit the embodiments to the precise form disclosed. Modifications and variations are possible in light of the above disclosure or may be acquired from practice of the embodiments.

While a series of blocks have been described with regard to FIG. 4, the order of the blocks may be modified in other implementations. Further, non-dependent blocks may be performed in parallel.

Even though particular combinations of features are recited in the claims and/or disclosed in the specification, these combinations are not intended to limit the disclosure of the possible embodiments. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a first waveguide, including a curved section having a first width, the first width having polarization conversion of light over the curved section of the first waveguide; and
a second waveguide, including a curved section having a second width, the second width being different than the first width and the second waveguide being spaced from the first waveguide, the second width having reduce polarization conversion of light over the curved section of the second waveguide, the reduction of polarization conversion in the first and second waveguides being relative to resonant polarization conversion that would otherwise occur if the first and second waveguides were of equal width,
where the first width has a value, such that a first arc-length of the curved section of the first waveguide is a first integer multiple of a first beat length of the first waveguide, and where the second width has a value, such that a second arc-length of the curved section of the second waveguide is a second integer multiple of a second beat length of the second waveguide,
where the first waveguide includes a first straight section, connected to the curved section of the first waveguide; and
where the second waveguide includes a second straight section, connected to the curved section of the second waveguide,
wherein the curved section of the first waveguide has an associated change in optical path length which would not be present in an absence of the first arc-length having the first integer multiple of the first beat length, a width of the first straight section offsetting the change in the optical path length of the first waveguide, and
wherein the curved section of the second waveguide has an associated change in optical path length which would not be present in an absence of the second arc length having the second integer multiple of the second beat length, a width of the second straight section offsetting the change in the optical path length of the second waveguide.

2. The device of claim 1, further comprising:
a substrate, the first and second waveguides being arranged on the substrate as part of a photonic integrated circuit (PIC).

3. The device of claim 1, where the widths of the first and second straight sections are not equal.

4. The device of claim 1, where the first and second waveguides are included in the device as part of a Mach-Zehnder interferometer, after optical sources, or before or after optical filters.

5. The device of claim 1, where the first and second waveguides are spaced from one another by approximately 5-50 micrometers.

6. An optical bus comprising:
a plurality of optical waveguides, each of which being spaced from one another, each of the plurality of optical waveguides having a corresponding one of a plurality of curved sections, and widths of the plurality of curved sections being not equal to one another and being reducing polarization conversion of light propagating in the plurality of optical waveguides, the reduction of polarization conversion being relative to resonant polarization conversion that would otherwise occur if the plurality of optical waveguides were of equal width, where, each of the widths of the plurality of curved sections has a corresponding value such that an arc-length of each of the plurality of curved sections is an integer multiple of a respective one of a plurality of beat lengths of the optical waveguides; and a plurality of straight sections, each of which being connected to a respective one of the curved sections of the plurality of optical waveguides, wherein each of the plurality of curved sections has an associated one of a plurality of optical path length changes which would not be present in an absence of the integer multiple of beat lengths of the arc lengths of the plurality of waveguides, a width of each of the plurality of straight sections being selected to offset the plurality of optical path length changes.

7. The optical bus of claim 6, further comprising:
a substrate, the plurality of optical waveguides being arranged on the substrate as part of a photonic integrated circuit (PIC).

8. The optical bus of claim 6, where the widths of the plurality of straight sections are formed to not be equal to one another.

9. The optical bus of claim 6, where the plurality of optical waveguides being included in the device as part of a Mach-Zehnder interferometer, after optical sources, or before or after optical filters.

10. The optical bus of claim 6, where the plurality of waveguides are spaced from one another by approximately 5-50 micrometers.

11. A photonic integrated circuit (PIC) comprising:
a substrate;
a plurality of optical sources formed on the substrate;
a plurality of optical modulators, formed on the substrate, to receive light from the plurality of optical sources and to modulate the light;
a plurality of optical waveguides, each of which being formed on the substrate and being spaced from one another, the light propagating in the plurality of optical waveguides, the plurality of optical waveguides each including a respective one of a plurality of curved sections, widths of the plurality of curved sections of the plurality of optical waveguides being not equal to one another and to minimize polarization conversion of the light propagating in the plurality of optical waveguides relative to resonant polarization conversion that would otherwise occur if the plurality of optical waveguides were of equal width,
where the widths of the curved sections of the plurality of optical waveguides result in an arc-length of each of the plurality of curved sections that is an integer multiple of a respective one of a plurality of beat lengths of the plurality of optical waveguides; and
a plurality of straight sections, connected to respective ones of the curved sections of the plurality of optical waveguides, wherein each of the plurality of curved sections has an associated one of a plurality of optical path length changes which would not be present in an absence of the arc lengths having the integer multiple of beat lengths of the plurality of waveguides, a width of each of the plurality of straight sections being selected to offset the plurality of optical path length changes.

12. The PIC of claim 11, where the widths of the plurality of straight sections are not equal to one another.

13. The PIC of claim 11, where the plurality of waveguides are spaced from one another by approximately 5-50 micrometers.

14. A device comprising:
a first waveguide, including a curved section having a first birefringence, the first birefringence reducing polarization conversion of light over the curved section of the first waveguide; and
a second waveguide, including a curved section having a second birefringence, the second birefringence being different than the first birefringence and the second waveguide being spaced from the first waveguide, the second birefringence reducing polarization conversion of light over the curved section of the second waveguide, the reduction of polarization conversion in the first and second waveguides being relative to resonant polarization conversion that would otherwise occur if the first and second waveguides had the same birefringence, the first and second birefringence resulting from differences in at least one of a thickness of at least one of a core and cladding of the first and second waveguides, an index of a core and cladding of the first and second waveguides, and a stress on at least one of the first and second waveguides,
where the first waveguide has a first width having a value such that an first arc-length of the curved section of the first waveguide is a first integer multiple of a first beat length of the first waveguide, and the second waveguide has a second width having a value such that an arc-length of the curved section of the second waveguide is a second integer multiple of a second beat length of the second waveguide,
where the first waveguide includes a first straight section, connected to the curved section of the first waveguide; and
where the second waveguide includes a second straight section, connected to the curved section of the second waveguide, wherein the curved section of the first waveguide has an associated change in optical path length of the first waveguide which would not be present in an absence of the first arch length having the first integer multiple of the first beat length, a width of the first straight section offsetting the change in the optical path length of the first waveguide, and
wherein the curved section of the second waveguide has an associated change in optical path length of the second waveguide which would not be present in an absence of the second arc length having the second integer multiple of second beat lengths, a width of the second straight section offsetting the change in the optical path length of the second waveguide.

15. The device of claim 14, further comprising:
a substrate, the first and second waveguides being arranged on the substrate as part of a photonic integrated circuit (PIC).

16. The device of claim 14, where the widths of the first and second straight sections are not equal.

17. The device of claim 14, where the first and second waveguides are included in the device as part of a Mach-Zehnder interferometer, after optical sources, or before or after optical filters.

18. The device of claim 14, where the first and second waveguides are spaced from one another by approximately 5-50 micrometers.

* * * * *